(12) United States Patent
Matteoli

(10) Patent No.: US 6,314,673 B1
(45) Date of Patent: Nov. 13, 2001

(54) FISHING SINKER RELEASE

(76) Inventor: Orindo Matteoli, 30 Blair St., Cloverdale, CA (US) 95425

( * ) Notice: Subject to any disclaimer, the term of this patent is extended or adjusted under 35 U.S.C. 154(b) by 0 days.

(21) Appl. No.: 09/502,400

(22) Filed: Feb. 10, 2000

(51) Int. Cl.[7] ................................................. A01K 97/00
(52) U.S. Cl. ............................................................ 43/43.12
(58) Field of Search ............................................ 43/43.12

(56) References Cited

U.S. PATENT DOCUMENTS

| | | | |
|---|---|---|---|
| 1,296,370 | * 3/1919 | Darling | 43/43.12 |
| 2,359,588 | * 10/1944 | Shea | 43/43.12 |
| 2,488,475 | * 11/1949 | Merritt | 43/43.12 |
| 2,562,054 | 7/1951 | Mathieu . | |
| 2,627,692 | * 2/1953 | Goodman | 43/43.12 |
| 2,716,832 | * 9/1955 | Minnie | 43/43.12 |
| 2,735,211 | 2/1956 | Grobl et al. . | |
| 2,749,650 | 6/1956 | Rees . | |
| 2,844,906 | 7/1958 | Phillips . | |
| 2,858,637 | * 11/1958 | Stark | 43/43.12 |
| 2,907,134 | * 10/1959 | Trantvetter | 43/43.12 |
| 2,932,115 | * 4/1960 | Dunn | 43/43.12 |
| 2,994,622 | 8/1961 | Miller . | |
| 3,057,108 | 10/1962 | Jacobsen . | |
| 3,068,605 | * 12/1962 | Munsinger | 43/43.12 |
| 3,391,482 | * 7/1968 | Benoit | 43/43.12 |
| 3,619,932 | 11/1971 | Maxwell . | |
| 4,267,659 | * 5/1981 | Grasso | 43/43.12 |

* cited by examiner

Primary Examiner—Kurt Rowan
(74) Attorney, Agent, or Firm—Johnson & Stanbrook, LLP; Larry D. Johnson; Craig M. Stanbrook

(57) ABSTRACT

An adjustable fishing sinker release enabling release of a sinker from a fishing line after a fish has been hooked includes a generally hollow housing member, open at both ends, bearing a hole proximate one end for attachment to a fishing line, and a release slot along one side for releasable capture of a sinker. A pin member is slidably engaged within the housing member, and includes a first leg portion that catches on the housing member and prevents disengagement, a loop portion for attachment of a fishing hook, and a second leg portion that selectively extends across and closes the slot on the one side of the housing member. When a fish strikes the fishing hook, the pin moves to the open position, opening the slot and releasing the sinker. The force required to move the pin may be easily and conveniently adjusted either at the time of manufacture or in the field to fit the intended catch.

4 Claims, 7 Drawing Sheets

FISHING SINKER RELEASE

BACKGROUND OF THE INVENTION

1. Field of the Invention

This invention relates generally to fishing tackle and equipment, and more specifically to an improved sinker release device for fishing.

2. Description of the Prior Art

In the sport of fishing, particularly lake and ocean fishing, it is often necessary to use a weight or sinker to direct and keep the bait or lure at an appropriate depth. However, when a sinker is attached and remains attached to a fishing line after a fish is hooked, it is more difficult for the fisherman to successfully land the fish. Accordingly, it is desirable to be able to release the sinker after the fish has been hooked. Several devices have been designed to accomplish this task, but many are inefficient, prone to failure, or too expensive for practical use. Perhaps as significantly, the prior art devices are manufactured to release the sinker under a very limited range of pulling forces caused by a hooked fish. For example, some devices will release the sinker when too light a fish is hooked or, just as defectively, will fail to release the sinker even when a suitably sized fish is hooked. It is therefore desirable to have a fishing sinker release apparatus with some means to adjust the force required to release the sinker; that way, a fisherman could conveniently and easily tailor the apparatus to release the sinker under precisely specified levels of pulling force.

SUMMARY OF THE INVENTION

The fishing sinker release of the present invention provides an improved device enabling adjustable release of a sinker from the fishing line after a fish has been hooked. The inventive device includes a generally hollow housing member open at both ends, bearing a hole proximate one end for attachment to a fishing line, and a slot along one side thereof for releasable capture of a sinker (e.g., typically connected by a short piece of line). The housing member may also be regarded as a kind of jacket, sleeve, or sheath member. A coil spring, or pin member, is slidably engaged within the housing member. The pin member includes a first leg portion that catches on the housing member and prevents disengagement, a loop portion for attachment of a fishing hook (again, typically connected by a short piece of line), and a second leg portion that selectively extends across and closes the slot on the one side of the housing member. When assembled the pin member is temporarily stationarily secured within the housing member by the forces exerted against the housing member by the leg portions.

In the first preferred embodiment of the present invention, the force required to release a sinker may be adjusted before assembly of the apparatus. The means to accomplish the adjustment involves selectively spreading or approximating the first and second leg portions of the pin member around the loop spring portion to urge or press the leg portions with more or less force, respectively, against the interior surface of the housing member.

In a second preferred embodiment, the housing member is open on its front side for easier removal of the pin member. Removal entails pinching or bending the first leg portion toward the second leg portion so that the first leg portion is free to rotate up and away from the housing member; the second leg portion is then slide out and away from the housing member. When removed, the pin member may be adjusted so that when reassembled, the first and second leg members either engage the housing member more forcefully or less forcefully. The adjustment is accomplished simply by bending the first and second leg portions relative to one another, either by spreading or approximating the first and second leg portions around the loop portion.

The inventive device is used by attaching the fishing line from the pole to the hole on the end of the housing member, attaching the line from the fish hook to the loop portion of the pin member, and the line from the sinker to the slot on the housing member by first opening the slot by sliding the pin and its second leg portion to open the slot, and then sliding the pin and its second leg portion to close the slot and capture the sinker line. When a fish of sufficient size or play strikes the fishing hook, the force of the strike causes the pin to again extend to the open position, opening the slot and releasing the sinker. The pin is prevented from complete removal from the housing by the first leg portion that engages the housing.

BRIEF DESCRIPTION OF THE DRAWINGS

FIG. 15A is a front side elevation view of the housing member of the fishing sinker release of the second preferred embodiment of this invention, while

DETAILED DESCRIPTION OF A PREFERRED EMBODIMENT

Figure 1:
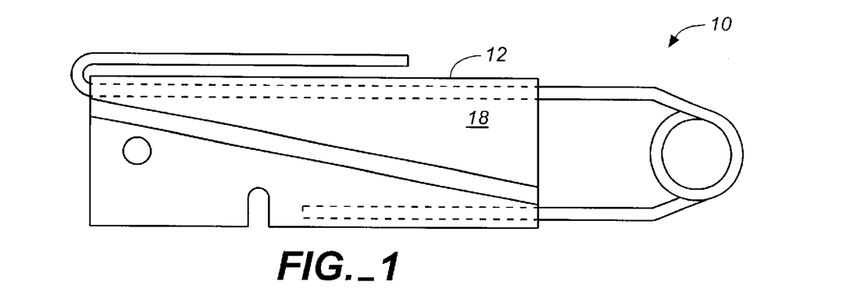
FIG. 1 is a front side elevation view of the assembled fishing sinker release of this invention.
Figure 2:
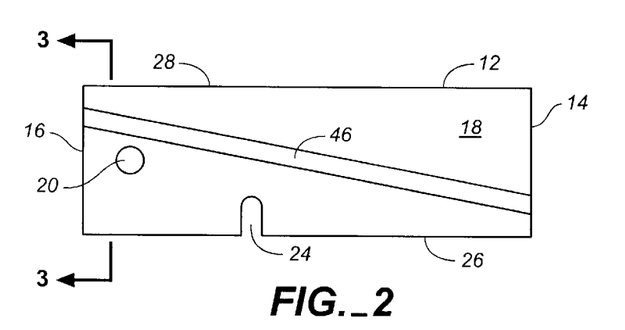
FIG. 2 is a front side elevation view of the housing member of FIG. 1.
Figure 3:
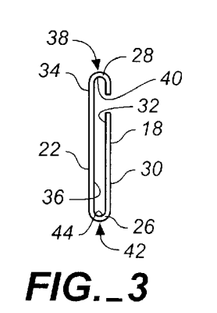
FIG. 3 is a cross sectional end view of the housing member of FIG. 2, said cross sectional view taken along Line 3 as indicated in FIG. 2, above.
Figure 4:
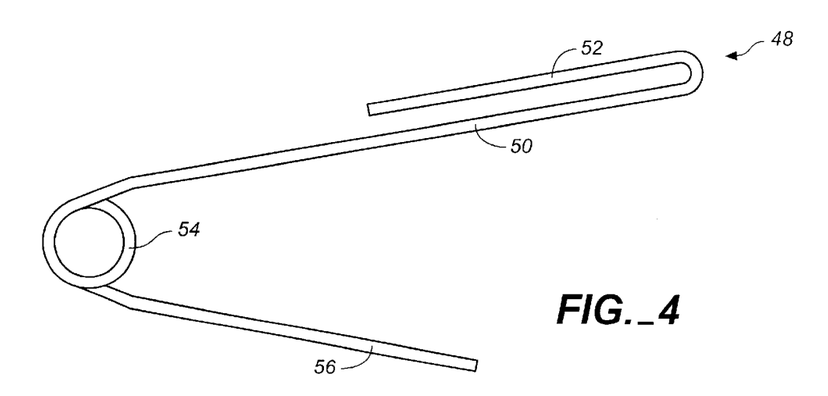
FIG. 4 is a side elevation view of the pin member of the fishing sinker release of this invention, shown removed from the housing member.

FIG. 1 is a front side elevation view of the fishing sinker release 10 of the present invention. FIG. 2 is a front side elevation view of the housing member 12, while FIG. 3 is an end view thereof, said cross sectional view taken along Line 3, as indicated in FIG. 2. The housing is a kind of jacket, sleeve, or sheath member within which the operative action of this invention occurs. In this first preferred embodiment of the present invention, housing member 12 is open at both proximal end 14 and distal end 16. The housing member has a substantially enclosed front side 18, a hole 20 at proximal end 14 for attachment to a fishing line, an enclosed rear side 22, a 13 release slot 24 along the bottom side 26 for releasable capture of a sinker, and a top side 28. The side surfaces include: a front side exterior surface 30, a front side interior surface 32; a rear side exterior surface 34, a rear side interior surface 36; a top side exterior surface 38, a top side interior surface 40; a bottom side exterior surface 42, and a bottom side interior surface 44. The housing member 10 may be made of brass or similar suitable material and in its first preferred embodiment further includes a diagonal slot 46 for rapid removal of the coil spring, or pin member, 46 shown in FIG. 4, which is a side elevation view of said pin member.

Pin member 48 includes a first leg portion 50 bearing a return 52 that is adapted to catch on the housing member top side 28 (FIGS. 1–3) and prevent disengagement when a pulling force is exerted on the apparatus. Pin member 48 further includes a loop portion 54 for attachment of a fishing hook (again, typically connected by a short piece of line), and a second leg portion 56 that is of a length to selectively extend across and close the release slot 24 on the bottom side of the housing member 12. Pin member 48 is preferably made of stainless steel wire or similar suitable material. As may be readily appreciated, the top and bottom side interior surfaces comprise elongate channels within which the first and second leg portions of the pin member are slidably engaged.

Figure 5:
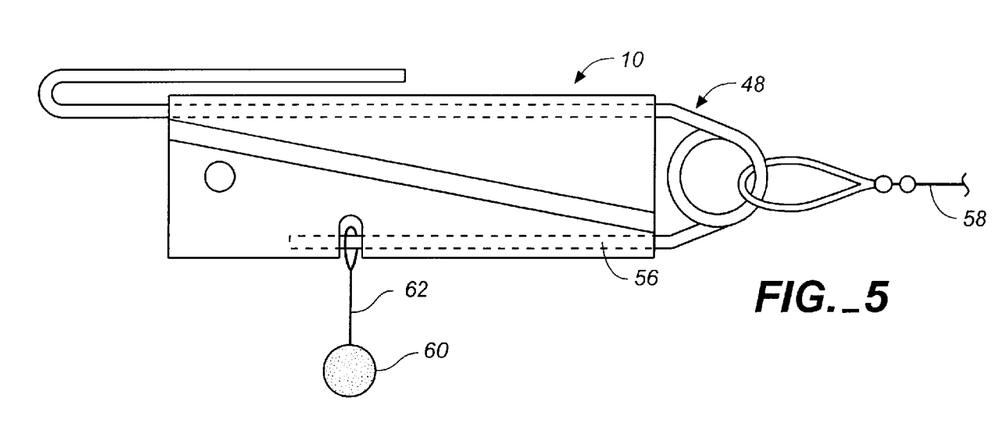
FIG. 5 is a side elevation view of the fishing sinker release of this invention as installed on a fishing line and hook and sinker, illustrating the device in its fully closed configuration.
Figure 6:
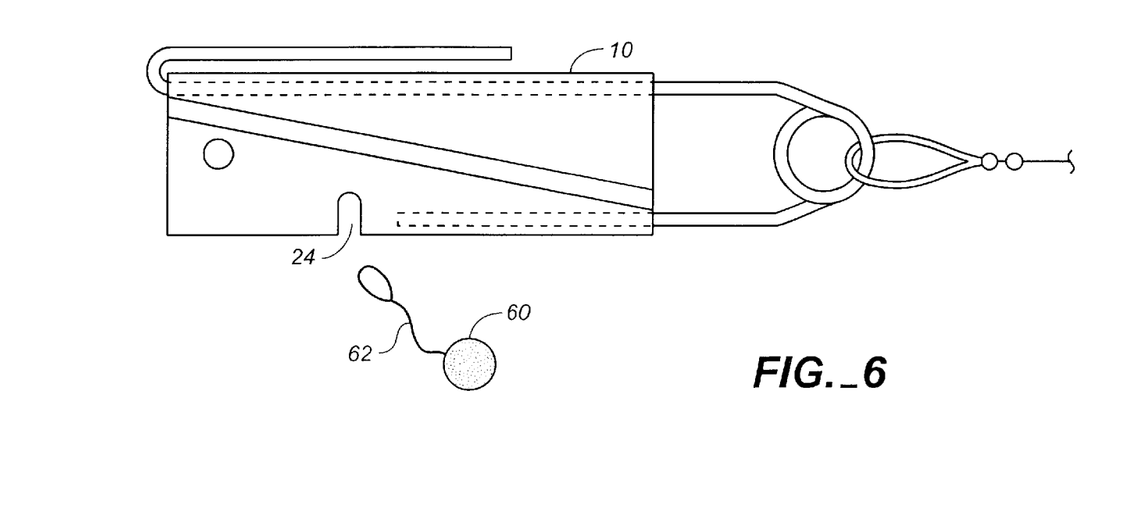
FIG. 6 is a side elevation view of the sinker release illustrating the device in its open configuration with the sinker released.

In operation, the fishing sinker has a closed and an open configuration. FIG. 5 is a side elevation view of the fishing sinker release 10 of this invention as installed on a fishing line 58 with hook and sinker 60, connected to the housing member via a line or leader 62, which is looped around the first leg portion 56 of the pin member 48. illustrating the device in its closed configuration, and FIG. 6 is a side elevation view of the sinker release illustrating the device in its open configuration with the sinker released. When assembled the pin member is temporarily stationarily secured within the housing member by the forces exerted against the interior surfaces of the top and bottom sides of the housing member.

Figure 7:
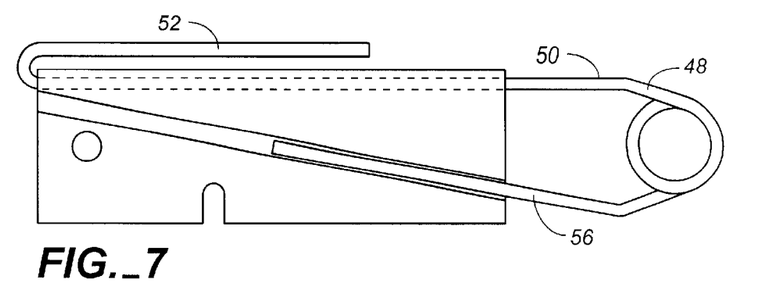
FIGS. 7 through 10 illustrate the steps for completely removing the pin member from the housing member for adjusting the release tension of the sinker release.
Figure 8:
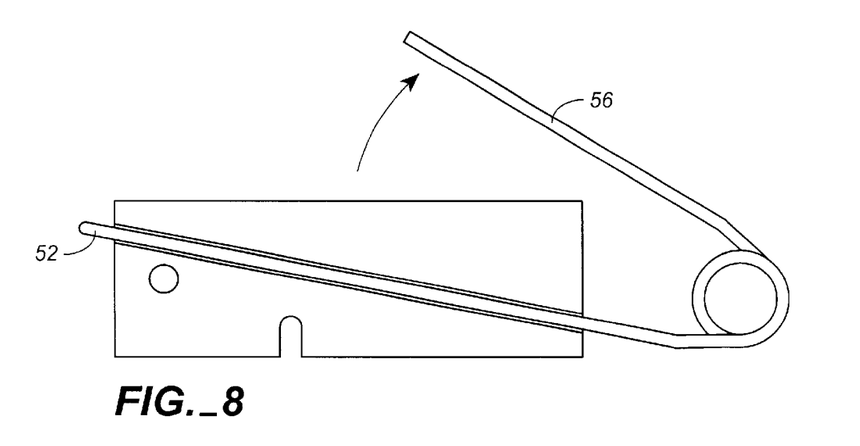
Figure 9:
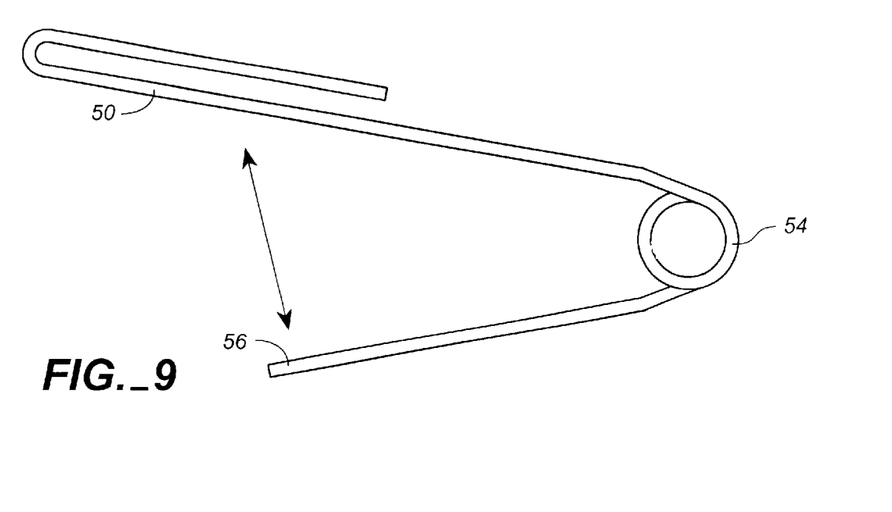
Figure 10:
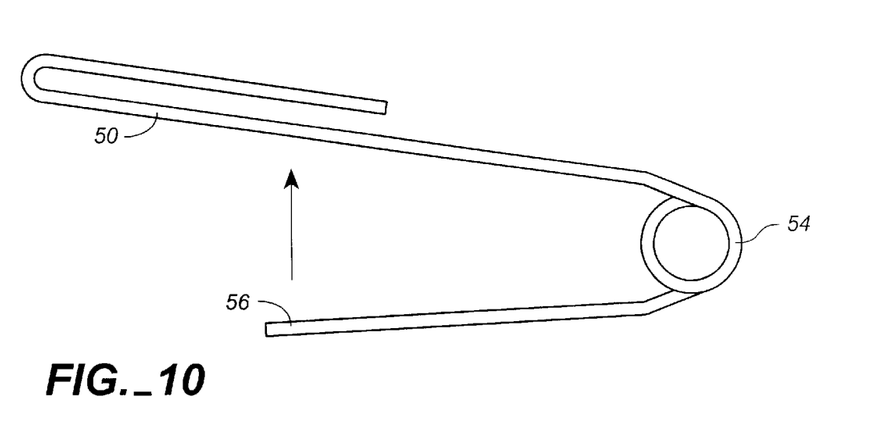

In the first preferred embodiment of the present invention, the force required to release a sinker may be readily and easily adjusted, either before assembly or at any time when not actually in use. There are two means to accomplish the adjustment as illustrated in FIGS. 7 through 10 and FIGS. 11 through 14. FIGS. 7–8 show that second leg portion 56 of pin member 48 may be pinched inwardly toward second leg member 50 while the pin member is installed in the housing member 12 so that it may be pivoted outwardly through diagonal slot 46. Once in this pivoted configuration, FIG. 8, the pin member may be entirely removed from the housing member and, as shown in FIGS. 9–10, the leg portions of the pin member selectively spread or approximated to adjust the tension in the pin member to urge or press the leg portions with more or less force against the top and bottom side interior surfaces, 40 and 44 in FIGS. 1–3, respectively, of housing member 12.

Figure 11:
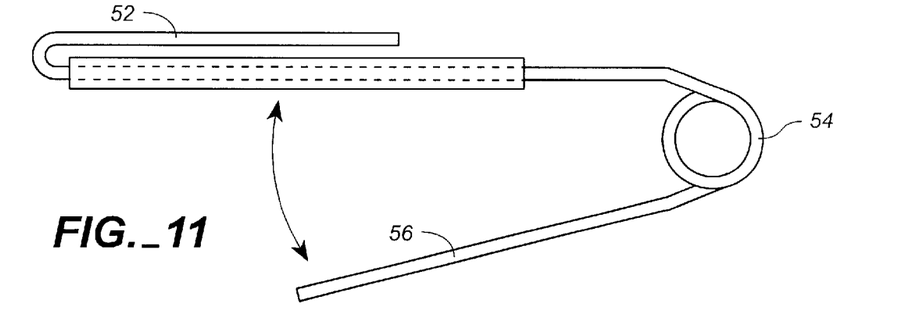
FIGS. 11 through 14 show the steps for an alternate means of adjusting the pin member comprising only partial removal of the pin member from the housing member.
Figure 12:
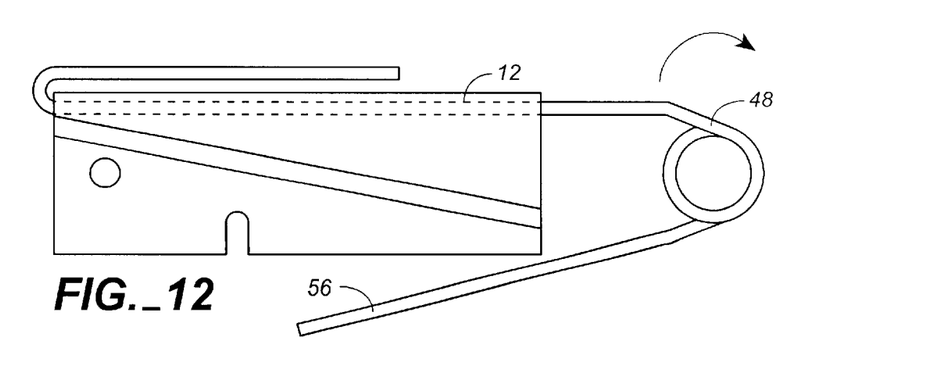
Figure 13:
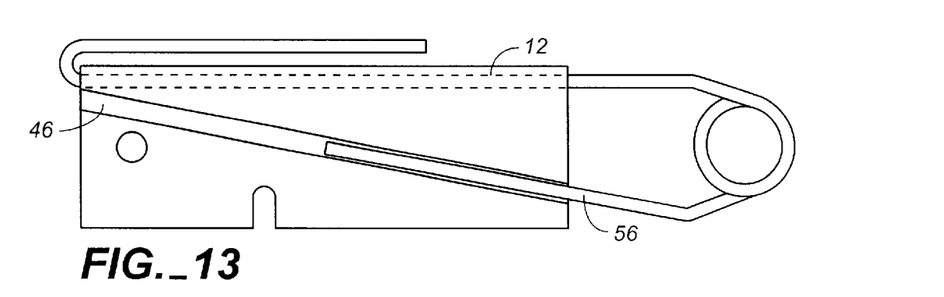
Figure 14:
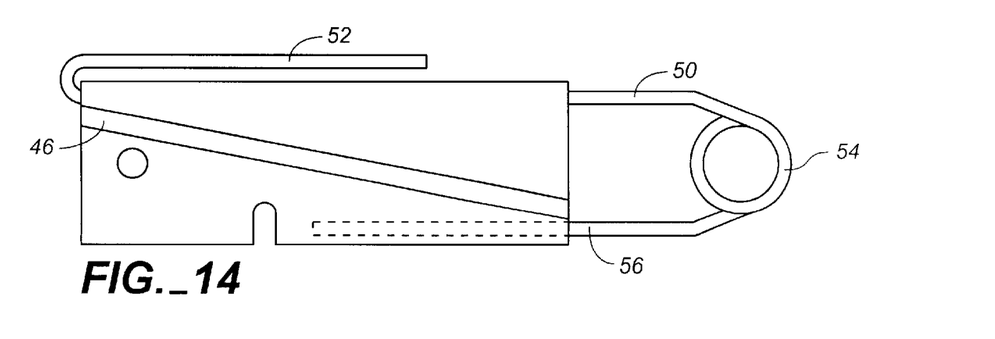

FIGS. 11–14 illustrate alternative means of adjusting the pin member. FIG. 11 is a top side view of the pin member 48 with the second leg portion 56 removed from the housing member 12, as described above. In this configuration, even without removing the pin member from the housing member, the second leg portion can be either spread or approximated relative to the first leg portion of the pin member so that the legs are urged to press with increasing or decreasing force against the top and bottom side interior surfaces of the housing member. FIG. 12 is a front side elevation view showing the second leg portion 56 of the pin member 48 positioned for reassembly within housing member 12. In FIG. 13, second leg portion has been pinched upwardly so that it slips within diagonal slot 46. FIG. 14 shows the sinker release when reassembled.

Figure 15A:
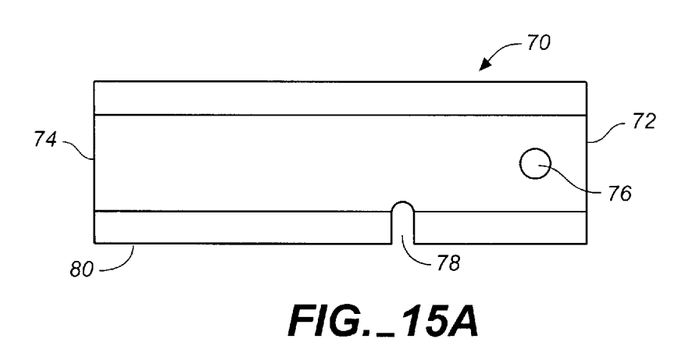
Figure 15B:
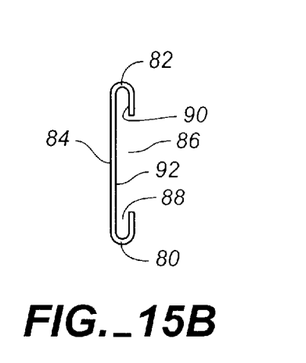
FIG. 15B is an end elevation view thereof.

FIG. 15A is a front side elevation view of the housing member 70 of the fishing sinker release of a second preferred embodiment of this invention, while FIG. 15B is an end elevation view thereof In this second preferred embodiment of the present invention, housing member 70 is again open at both its proximal end 72 and its distal end 74. And, again, the housing member has a hole 76 at its proximal end 72 for attachment to a fishing line. The housing member further has a release slot 78 along the bottom side 80 for releasable capture of a sinker, a top side 82, and a rear side 84. The front side 86 is open, being defined by a first partial arcuate closing 88 and a second partial arcuate closing 90, thereby exposing the interior surface 92 of the rear side 84. There is no imperative that the closings are arcuate, and any of a number of suitable configurations will suffice. The closings form channels within which pin member leg portions are slidably engaged.

Figure 16:
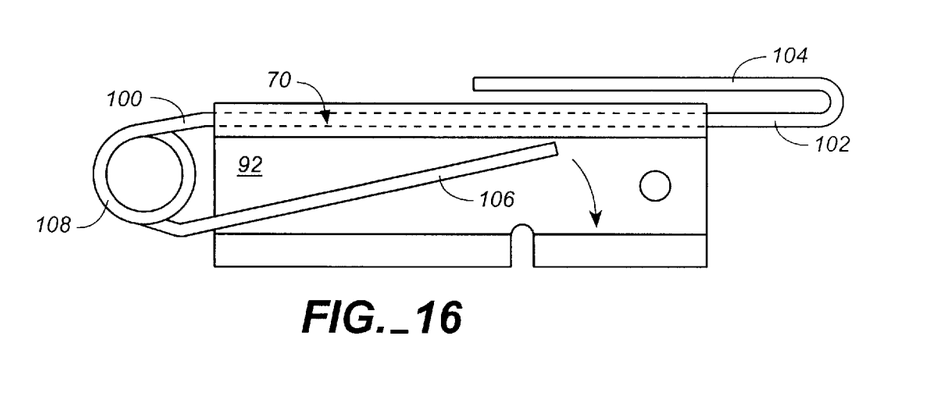
FIG. 16 is a front side elevation view of the assembled fishing sinker release of FIGS. 15A–B showing the first leg portion of the pin member bent inwardly for removal from the housing member.

FIG. 16 is a front side elevation view of the assembled fishing sinker release apparatus showing that pin member 100 again comprises a first leg portion 102 bearing a return 104, a second leg portion 106, and a loop portion 108. In this second preferred embodiment, as in the first preferred embodiment described above, the pin member 100 is readily removed from the housing member 70 for adjustment of the spring tension between the first and second leg portions. Accordingly, the force imparted by the leg portions of the pin member against the interior surfaces of the top and bottom sides of the housing member is adjustable, enabling a fisherman to adjust the force required to slide the pin member so as to release an attached sinker. Removal entails simply pinching or bending the second leg portion 106 inwardly and toward the first leg portion 102 so that the second leg portion is free to rotate up and away from the interior surface 92 of the rear side 84. The second leg portion 106 is then moved outwardly from the housing member. Once the second leg portion is entirely exposed it may either be disengaged from the housing member for adjustment or, alternatively, it may be adjusted in place. The adjustment is accomplished as described above. The force with which the leg portions of the pin member engage the interior surfaces of the top and bottom sides is thereby adjusted and the frictional resistance to movement increased or decreased accordingly. Thus, a fisherman in the field can tailor the fishing sinker release apparatus to fit his intended catch. In both the first and second embodiments, this adjustment may be made quite precisely.

Figure 17:
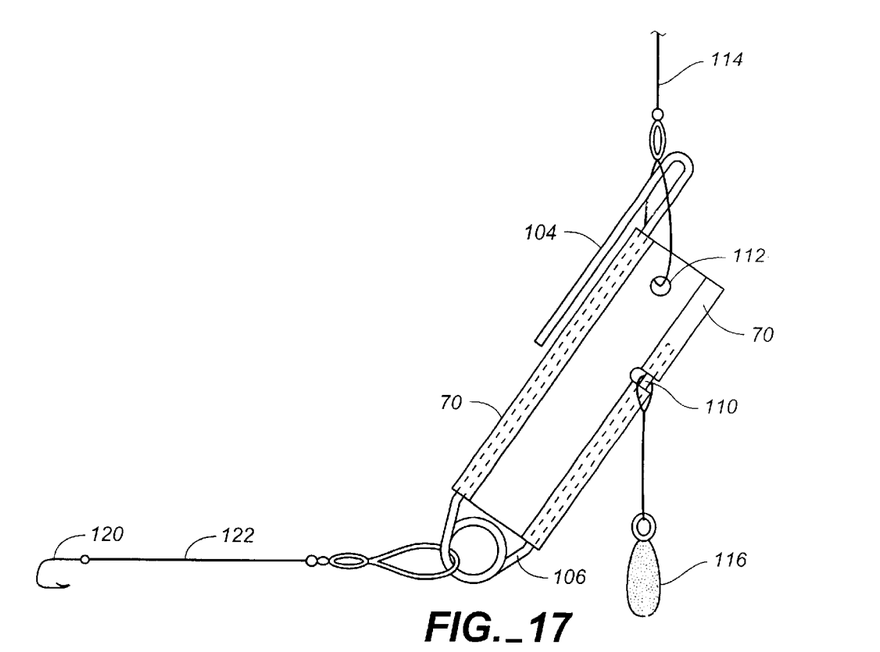
FIG. 17 is a front side elevation view of the fishing sinker release of FIGS. 15A through 16 as installed on a fishing line, fishing hook and sinker, and illustrating the device in its fully closed configuration.

FIG. 17 shows the angle of the sinker release while trolling. This angle is desirable because the release slot 110 is directly below hole 112 on the housing 70 which is where the fishing line 114 is attached. This figure also shows the sinker release closed to show how the second leg portion 106 of the pin member forms a catch on which the sinker 116 is attached via a looped leader or line 118. By pushing the pin member forward, it locks the sinker on. The short piece of leader (e.g., monofilament, braided line, small copper wire, heavy thread, etc.) is in the corner of the release slot. In this way, one can put any amount of weight on and it will not release.

Figure 18:
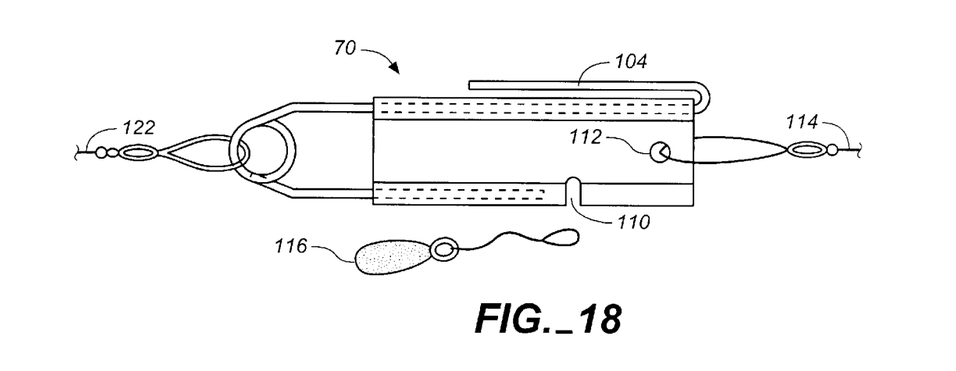
FIG. 18 is a front side elevation view of the sinker release of FIG. 17 shown in its open configuration.

FIG. 18 shows that when a fish strikes hook 120 and pulls on line 122, the pin member extends out which causes it to release the sinker (FIG. 18).

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. An adjustable fishing sinker release apparatus for attachment to a fishing line, hook and sinker, enabling release of the sinker from the fishing line when a fish is hooked, said apparatus comprising:

a generally hollow housing member having a pair of open ends and a pair of sides, said housing member bearing a hole proximate one end for attachment to a fishing line, and a release slot along one side thereof for releasable capture of a sinker, wherein said housing member has a distal end and a proximal end and a diagonal slot running its entire length from its proximal to distal end so that said second leg portion of said pin member may be removed from said housing member by pivoting said second leg portion outwardly through the diagonal slot so that said second leg portion can be spread or approximated relative to said first leg portion; and a pin member adapted for sliding engagement within said housing member, said pin member including a first leg portion adapted to catch on said housing member and prevent disengagement, a loop portion comprising a loop spring for attachment of a fishing hook, and a second leg portion adapted to selectively extend across and close said release slot on said housing member; wherein when a fish strikes the fishing hook, the force of the strike causes said pin to open said slot and release the sinker.

2. An adjustable fishing sinker release apparatus for attachment to a fishing line, hook and sinker, enabling release of the sinker from the fishing line when a fish is hooked, said apparatus having an open and a closed configuration, said apparatus comprising:

a generally hollow jacket member having an open proximal end, an open distal end, a top and a bottom side, a generally open front side, and an enclosed rear side, and said jacket member having a hole at its proximate end for attachment to a fishing line, and a slot on its bottom side for releasable capture of a sinker, wherein said top and bottom sides comprise partial closings that form channels in the interior surfaces of said top and bottom sides for said first and said second leg portions, respectively, of said pin member to slidably engage said jacket member; and a pin member slidably secured within said jacket member, said pin member including a first leg portion bearing a return to catch on said jacket member and prevent disengagement, a loop portion for attachment of a fishing hook, and a second leg portion adapted to selectively extend across and cover said slot when in the closed configuration, and wherein when a fish strikes the fishing hook, the force of the strike causes said coil spring to slide laterally within said sleeve member to open said slot and release the sinker.

3. An adjustable fishing sinker release apparatus for attachment to a fishing line, hook and sinker, enabling release of the sinker from the fishing line when a fish is hooked, said apparatus comprising:

a generally hollow sleeve member having an open proximal end, an open distal end, a top and a bottom side, and enclosed front rear sides, and said housing member having a hole at its proximate end for attachment to a fishing line, a release slot on its bottom side for releasable capture of a sinker, and a diagonal slot on its front side running from said proximal to said distal ends; and a coil spring member slidably secured within said housing member, said coil spring member including a first leg portion bearing a return to catch on said housing member and prevent disengagement, a loop portion for attachment of a fishing hook, and a second leg portion adapted to selectively extend across and cover said slot when in the closed configuration, and wherein when a fish strikes the fishing hook, the force of the strike causes said coil spring to slide laterally within said sleeve member to open said slot and release the sinker, said coil spring member having an adjustable tension between said first and second leg portions to urge said first and second leg portions against the interior sides of said housing member, and said second leg portion removable from said housing member through the diagonal slot on said front side of said housing member.

4. The fishing sinker release of claim 3 wherein said housing member has an enclosed front side, an enclosed rear side; and wherein the top, bottom, front and rear side surfaces include a front side exterior surface, a front side interior surface, a rear side exterior surface, a rear side interior surface, a top side exterior surface, a top side interior surface, a bottom side exterior surface, and a bottom side interior surface.

\* \* \* \* \*